United States Patent
Mitsuno et al.

(10) Patent No.: US 10,997,976 B2
(45) Date of Patent: May 4, 2021

(54) AUTHENTICATION SYSTEM, AUTHENTICATION METHOD, AND, NON-TRANSITORY COMPUTER-READABLE INFORMATION RECORDING MEDIUM FOR RECORDING PROGRAM

(71) Applicant: Passlogy Co., Ltd., Tokyo (JP)

(72) Inventors: Motohiko Mitsuno, Tokyo (JP); Hideharu Ogawa, Tokyo (JP)

(73) Assignee: Passlogy Co., Ltd., Tokyo (JP)

( * ) Notice: Subject to any disclaimer, the term of this patent is extended or adjusted under 35 U.S.C. 154(b) by 204 days.

(21) Appl. No.: 16/385,656

(22) Filed: Apr. 16, 2019

(65) Prior Publication Data

US 2019/0318738 A1    Oct. 17, 2019

(30) Foreign Application Priority Data

Apr. 16, 2018    (JP) .............................. JP2018-078545

(51) Int. Cl.
*G10L 15/22*    (2006.01)
*G07C 9/00*    (2020.01)
(Continued)

(52) U.S. Cl.
CPC .......... *G10L 15/22* (2013.01); *G07C 9/00563* (2013.01); *G10L 15/02* (2013.01); *G10L 17/02* (2013.01)

(58) Field of Classification Search
None
See application file for complete search history.

(56) References Cited

U.S. PATENT DOCUMENTS 6,141,751 A    10/2000  Ogawa
9,197,736 B2 *  11/2015  Davis ................ H04M 1/72583
(Continued)

FOREIGN PATENT DOCUMENTS

JP    2013037512 A    2/2013
JP    2014174255 A    9/2014
(Continued)

OTHER PUBLICATIONS

Suzuki, Technologies supporting authentication. Software Design, No. 323, pp. 10-103 (2017).
(Continued)

*Primary Examiner* — Neeraj Sharma
(74) *Attorney, Agent, or Firm* — K&L Gates LLP; Louis C. Cullman; Dennis A. Majewski (57) ABSTRACT

An authentication system prevents leakage of a key-reading speech during user authentication based on the key-reading speech of a user reading an authentication key. For each user ID, a storage stores a voiceprint of a user in association with a recorded sound including speech spoken previously by the user. A specifier specifies the user ID of a user attempting to receive authorization. An outputter outputs a masking sound that includes the recorded sound recorded in association with the specified user ID. An acquirer acquires a key-reading speech of the user reading the authentication key and the output masking sound. A remover acquires a second sound by removing the masking sound from the acquired first sound. A determiner determines whether the user has authority pertaining to the specified user ID based on the acquired second sound.

8 Claims, 8 Drawing Sheets

(51) Int. Cl.
*G10L 15/02* (2006.01)
*G10L 17/02* (2013.01)

(56) References Cited

U.S. PATENT DOCUMENTS

| | | | | |
|---|---|---|---|---|
| 2005/0131690 | A1* | 6/2005 | Creamer | H04M 3/382 |
| | | | | 704/246 |
| 2010/0305960 | A1* | 12/2010 | Gutierrez | G06Q 20/4016 |
| | | | | 705/1.1 |
| 2013/0132091 | A1* | 5/2013 | Skerpac | G06F 21/32 |
| | | | | 704/273 |
| 2014/0114665 | A1* | 4/2014 | Murgia | H04R 3/005 |
| | | | | 704/275 |
| 2014/0304505 | A1* | 10/2014 | Dawson | H04L 63/0428 |
| | | | | 713/165 |
| 2014/0380445 | A1* | 12/2014 | Tunnell | H04L 63/18 |
| | | | | 726/7 |
| 2016/0035349 | A1 | 2/2016 | Jung et al. | |
| 2016/0197938 | A1* | 7/2016 | van Overbruggen | G06F 21/16 |
| | | | | 726/30 |
| 2018/0007553 | A1* | 1/2018 | Dutt | G06F 21/316 |
| 2018/0040325 | A1* | 2/2018 | Melanson | G10L 17/24 |
| 2018/0146370 | A1* | 5/2018 | Krishnaswamy | G06F 16/951 |

FOREIGN PATENT DOCUMENTS

| | | |
|---|---|---|
| JP | 2017120576 A | 7/2017 |
| JP | 2018501557 A | 1/2018 |
| WO | 2008/044325 A1 | 4/2008 |
| WO | 2015/163774 A1 | 10/2015 |

OTHER PUBLICATIONS

Notification of Reasons for Rejection (Office Action) for Japanese Patent Application No. 2018-078545 dated Jul. 17, 2018 (Original and English Translation provided).

* cited by examiner

AUTHENTICATION SYSTEM, AUTHENTICATION METHOD, AND, NON-TRANSITORY COMPUTER-READABLE INFORMATION RECORDING MEDIUM FOR RECORDING PROGRAM

CROSS-REFERENCE TO RELATED APPLICATION

This application claims the benefit of Japanese Patent Application No. 2018-078545, filed on Apr. 16, 2018, the entire disclosure of which is incorporated by reference herein.

FIELD

The present disclosure relates to an authentication system and an authentication method suitable for prevention of leakage of a key-reading speech during user authentication based on the key-reading speech that is read by a user reading an authentication key, and relates to a non-transitory computer-readable information recording medium for recording a program for causing a computer or a computer group to function as the authentication system.

BACKGROUND

Technology is used heretofore that during authentication causes the hand of a user to contact something, such as by the user holding a smartphone in the hand to check displayed information, by the user touching a touch screen of a smartphone or a room entry system installed at an entrance or the like, or by the user removing an identification card from a wallet and using a scanner to scan the identification card.

However, for room access management to manage access to an operating room of a medical treatment facility, for example, technology is desired that, in order to prevent problems of hygiene and the spread of infection via the hand of the user, does not use the hand of the user.

Authentication technology using a voiceprint of the user exists as a technology capable of responding to such a situation. For example, in Unexamined Japanese Patent Application Kokai Publication (Translation of PCT Application) No. 2018-501557, an authentication method is mentioned in which a terminal: displays on a display interface terminal a randomly-generated dynamic password and starts an audio receiving device of the terminal; acquires voice information by using the audio receiving device while the user reads the dynamic keyword, converts the voice information into a text password, and extracts voiceprint characteristics of the voice information; when the text password is the same as the dynamic password, determines a terminal usage permission of the user according to a pre-stored correspondence between the terminal usage permission and the voiceprint characteristics; sets the terminal interface to an unlocked state or a locked state in accordance with the determined terminal usage permission; and when the text password is different from the dynamic password, sets the terminal interface to the locked state.

U.S. Pat. No. 6,141,751 discloses technology, invented by one of the inventors of the present disclosure, which, by having the user select characters from a random string of characters according to a conversion rule allocated to the user, makes a dynamic password from a string of characters obtained by arranging the values of the selected characters.

However, in an environment using a fixed password for authentication using a voiceprint, when the user reads out the fixed password serving as the authentication key, the fixed password of the user may leak when a third party in the vicinity overhears the fixed password, records the voice reading the fixed password, or the like.

Moreover, even in an environment in which a dynamic password is used as the authentication key in authentication using the voiceprint, non-leakage of the kind of dynamic password read out by the user is desired.

Thus in authentication using the widely and generally used voiceprint, technology is desired that prevents the leakage of key-reading speech when the user reads out the authentication key.

In order to solve the aforementioned problems, an object of the present disclosure is to provide an authentication system and an authentication method suitable for prevention of leakage of the key-reading speech during user authentication based on the key-reading speech that is read by the user reading an authentication key, and to provide a non-transitory computer-readable information recording medium for recording a program for causing a computer or a computer group to function as the authentication system.

The authentication system according to the present disclosure, for each of a plurality of user IDs, stores a voiceprint of a user having authority pertaining to the user ID in association with a recorded sound including speech spoken previously by the user having the authority pertaining to the user ID, and the authentication system:

specifies the user ID of the user attempting to receive authentication; outputs a masking sound including a recorded sound stored in association with the specified user ID;

acquires a first sound including (i) a key-reading speech of the user reading the authentication key and (ii) the outputted masking sound;

acquires a second sound by removing the masking sound from the acquired first sound; and determines whether the user has authority pertaining to the specified user ID based on the acquired second sound.

This authentication system can be achieved by a single computer or a computer groups formed from multiple computers executing a program in accordance with the various functions.

SUMMARY

The present disclosure provides an authentication system and an authentication method suitable for prevention of leakage of a key-reading speech during user authentication based on the key-reading speech that is read by a user reading an authentication key, and provides a non-transitory computer-readable information recording medium for recording a program for causing a computer or a computer group to function as the authentication system.

BRIEF DESCRIPTION OF THE DRAWINGS

A more complete understanding of this application can be obtained when the following detailed description is considered in conjunction with the following drawings, in which.

DETAILED DESCRIPTION

Embodiments of the present disclosure are described below. The present embodiments are for descriptive purposes, and do not limit the scope of the present disclosure. Thus one skilled in the art can utilize the embodiments by substitution of equivalents for each or all of the elements of the embodiments, and such embodiments are included within the scope of the present disclosure.

Basic Configuration of the Authentication System

Figure 1:
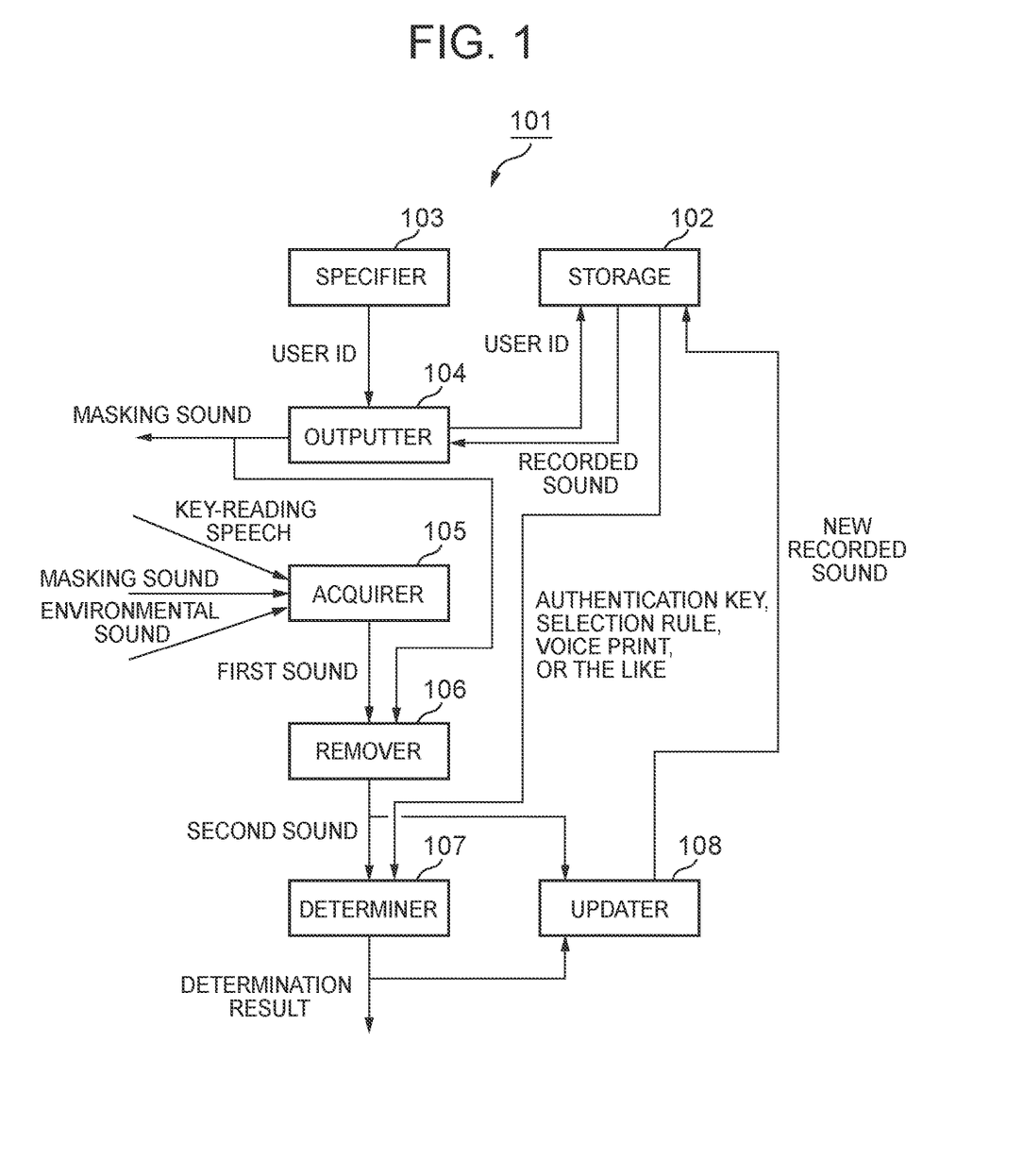
FIG. 1 is a descriptive drawing illustrating a summary of an authentication system according to an embodiment of the present disclosure.

FIG. 1 is a descriptive drawing illustrating a summary of an authentication system according to an embodiment of the present disclosure. The embodiment is described hereinafter with reference to this drawing.

An aforementioned authentication system 101 can be achieved by hardware of a computer or a computer group executing a specified program.

Generally, after reading out a program stored on a non-transitory information recording medium to a random access memory (RAM) that is a temporary storage device, a computer executes instructions included in the program read out by a central processing unit (CPU) or a processor. However, when using an architecture enabling execution by mapping the ROM and the RAM in a single memory space, the CPU directly reads out and executes the instructions included in the program stored in the ROM. In cooperation with the RAM or the like, the CPU, the processor, or the like controls a network interface card (NIC) provided for such hardware, and devices such as a display, a microphone, a speaker, or the like.

Each program can be stored on a non-transitory computer-readable information recording medium for recording a program, such as compact disc, a flexible disc, a hard disc, a hard disc, a magneto-optical disc, a digital video disc, a magnetic tape, a read only memory (ROM), an electrically erasable programmable ROM (EEPROM), a flash memory, a semiconductor memory, or the like. This information recording medium can be distributed and sold independently of the hardware units.

Furthermore, the aforementioned program can be can be distributed to the hardware units from a distribution device or the like via a transitory communication medium such as a computer network, independent of the computer executing the program.

Furthermore, the aforementioned program can be stored in the form of a programming language used for description at the operating level of an electronic circuit. In this case, a layout diagram, a timing chart, or the like of the electronic circuit, and various types of design drawings can be generated, and the electronic circuit constituting an image processing device can be created on the basis of such design drawings. For example, the aforementioned image processing device can be formed as reprogrammable hardware by field programmable gate array (FPGA) technology from the aforementioned program, or can be formed as a special dedicated-purpose electronic circuit by application specific integrated circuit (ASIC) technology.

This authentication system 101 is equipped with a storage 102, a specifier 103, an outputter 104, an acquirer 105, a remover 106, and a determiner 107. Moreover, an updater 108 may be provided as an optional element.

Firstly, for each user ID, the storage 102 stores a voiceprint of a user having the authority pertaining to the user ID in association with a recorded sound including speech spoken previously by the user having the authority pertaining to the user ID.

That is to say, the user ID is allocated to the user who is recognized via the authentication system 101. A voiceprint for voice recognition of the user having the authority pertaining to the user ID is stored in the storage 102.

Moreover, the speech spoken beforehand by the user having the authority pertaining to the user ID is typically speech spoken to the authentication system by the user during recording of the voiceprint, and is stored as recorded sound in association with the user ID.

For example, in the case of use of a number series for authentication, the user is made to read each of the numbers from "0" to "9" at the time of recording of the user ID, and together with such speech as recorded sound, voiceprint characteristics information obtained from the speech of reading each of the numbers may be recorded in the storage 102.

Furthermore, speech spoken in the past as well as predetermined speech of the user, recordings of another user, or the like may be used as the recorded sound.

The specifier 103 specifies the user ID of the user attempting to receive the authentication. Various modes may be considered for specifying the user ID of the user attempting to receive the authentication.

For example, modes exist as techniques widely used in a general authentication system in which the user ID is input using a keyboard or touchscreen, is selected from a list, or the like, and such modes may be used in the present embodiment.

Moreover, the user may be identified by sensing of a radio frequency identifier (RFID) embedded in an ID card, a name tag, a wristband, or the like worn by the user, by sensing of a printed barcode, two-dimensional code, or the like, or by sensing approach of a smartphone possessed by the user.

In cases in which the aforementioned input cannot be used due to reasons such as the inability to use the hand from the standpoint of hygiene, the existence of an environment in which an ID card or the like cannot be used, restrictions on the use of electromagnetic waves, or the like, the user can be identified by facial recognition or iris recognition.

Moreover, in the case of use of the authentication system 101 for room access management such as access to a medical treatment facility or a cleanroom, often the user wears a mask, hat, dust-proof glasses, or the like so that facial recognition or iris recognition cannot be used.

In such a case, the user ID may be identified by speech spoken by the user. Hereinafter, the speech spoken by the user for identification of the user ID to receive authentication is referred to as the "identifying speech".

The identifying speech corresponds to speech read by the user and is termed a "wakeup word" of a device such as a smart speaker.

In the present embodiment, the "identifying speech" is taken to be produced by the user speaking a word expression termed the "identifying phrase".

The identifying phrase may be a phrase shared by all users. For example, a word expression such as "authentication", "begin", "start", "OK, system", or "hey, system" may be used as the identifying phrase.

Moreover, the identifying phrase may differ according to the user ID. For example, a user ID spelling itself may be used as the identifying phrase, and the user's last name, first name, nickname, or the like may be used as the identifying phrase.

Moreover, the user may freely determine a password when registering with the authentication system 101, and the determined password may be used as the identifying phrase. Moreover, an identifying phrase prepared beforehand by the authentication system 101 may be provided to the user at the time of registering with the authentication system 101, and by the user reading the provided identifying phrase, the voiceprint characteristics of the identifying speech may be acquired and may be used during identification of the user.

In such a mode, the specifier 102 may acquire an identifying sound that includes the identifying speech spoken by the user attempting to receive authentication, and by voice recognition, may recognize from the identifying sound the phrase read by the user, and when the recognized phrase is the user ID allocated as the identifying phrase, may determine that the identifying sound specifies the user ID matching the stored voiceprint associated with the user ID.

There may be a single identifying phrase or multiple identifying phrases for each user ID. In cases in which the first and last names are the same, the pronunciation of the name is similar, or the like, a single user ID may be specified by several readings of different identifying phrases.

In the case of multiple specified user IDs, until one of the user IDs is specified, the specifier 102 may prompt the user to read new identifying phrases, may acquire new identifying sound that includes the identifying speech newly spoken by the user, and may specify the user ID by the new identifying sound repeatedly until just the single user ID is identified.

Moreover, a list of the multiple user IDs may be displayed on the display, and the user may move a cursor within the list by voice commands such as "up", "down", "right", "left", "next", and "previous", and may identify the user ID by a voice command such as "determined" when the cursor arrives at the desired user ID.

When the single user ID of the user attempting to receive authentication can be specified in this manner, the outputter 104 outputs a masking sound that includes the recorded sound stored in association with the specified user ID.

In this authentication system 101, the user reads word expression expressing the authentication key, and authentication is performed on the basis of the read speech, which is termed the "key-reading speech" in the present disclosure.

As mentioned above, the key-reading speech is preferably not disclosed to the third party. Thus during the speaking of the key-reading speech by the user, the masking sound is output via the speaker or the like, thereby making the third party in the vicinity incapable of recognizing the spoken key-reading speech.

The speaker is preferably located in the vicinity of the mouth of the user. Thus an installation location of the speaker is preferably determined on the basis of an average height of the users. Moreover, in the present embodiment, the user speaks toward a microphone in order to perform authentication by speech of the user. Thus since the mouth of the use is in the vicinity of the microphone, by placement of the microphone near the speaker, distinction can be made difficult between the key-reading speech spoken by the user and the masking sound generated by the speaker.

In the present embodiment, the masking effect can be increased by using as the masking sound speech spoken previously by the user.

That is to say, when the user reads the authentication key, the speech spoken previously by the user and included in the masking sound and the key-reading speech of the user reading the authentication key are superimposed on each other.

Thus during the output of the masking sound, the outputter 104 can increase the masking effect by superimposed outputting of a part or all of recording sounds associated with the specified user ID. That is to say, even while the user is not reading the authentication key, samples of speech spoken by the user are superimposed on each other and output. Thus even when the speech samples of the user become superimposed on each other, distinction is not possible as to whether the user is reading the authentication key or whether recorded sound samples spoken previously by the user are being superimposed, and thus the third party is unable to know that the "user is reading the authentication key". That is to say, in the present embodiment, during the period until the key-reading speech read by the user reading the authentication key is acquired, a "period in which the speech previously spoken by the user is superimposed" exists. Thus even when the "speech previously spoken by the user" and the "key-reading speech of the user reading the authentication key" are superimposed on each other, the "period in which the speech previously spoken by the user is superimposed" exists, and thus even in the case in which the third party records the state in which the "key-reading speech is spoken in the period in which the masking sound is generated", the third party has extreme difficulty in identifying the start and the conclusion of the reading of the authentication key by the user.

Further, the acquirer 105 acquires the first sound that includes the key-reading speech of the user reading the authentication key and the outputted masking sound.

Although the acquirer 105 acquires the first sound from the external world via the microphone, this first sound includes the masking sound generated by the speaker, the key-reading speech spoken by the user, and environmental sounds.

Further, if the directionality of the microphone is used, the effects of the masking sound and environmental sounds can be suppressed, and the first sound can be acquired in a manner that increases the key-reading speech component as much as possible.

Furthermore, the remover 106 acquires a second sound that removes the masking sound from the acquired first sound.

Due to output from the outputter 104 of the authentication system 101 being the masking sound, the authentication system 101 can understand what sort of waveform of sound is output. Thus the masking sound can be removed from the first sound by correlating the waveform of the masking sound and the waveform of the first sound.

That is to say, the remover 106, taking as parameter whether a degree of time delay $\Delta$ of the masking sound output by the outputter 104 via the speaker is detected by the microphone, slides a waveform of the masking sound, and identifies a time delay d for which the correlation value between the masking sound waveform and the first sound waveform are maximum.

Next, a correlation is made between a "result of sliding the waveform of the masking sound by the identified time delay d, multiplying by the amplification factor, and then subtracting from the waveform of the first sound" and a "waveform of the masking sound slid by the identified time delay d", and the amplification factor A is identified as having the value that minimizes the correlation value.

Thus the former value occurring at the time at which this amplification factor A is identified, that is, the "result of sliding the waveform of the masking sound by the identified time delay d, multiplying by the amplification factor A, and then subtracting from the waveform of the first sound", becomes the waveform of the second sound.

Additionally, by subjecting the two sounds of the first sound and the masking sound to independent component analysis or the like, speech separation and sound source separation can be performed, and thus the masking sound component, and the second sound obtained by subtracting the masking sound component, can be obtained.

Furthermore, the determiner 107 determines, on the basis of the acquired second sound, whether the user has the authority pertaining to the specified user ID.

An authentication voice of the user reading the authentication key is included in the second sound. Thus authentication succeeds when there is determination that the following conditions is satisfied: (1) the word expression obtained from the second sound by voice recognition is effective as the authentication key for the user ID, and/or (2) the second sound matches the voiceprint associated with the user ID, that is to say, when the necessary condition is satisfied for determination that the user seeking authentication has the authority pertaining to the user ID.

A fixed password or a dynamic password associated with the user ID may be used as the authentication key. In the mode in which the fixed password is used, the key-reading speech is the speech of the user reading out a recalled fixed password memorized by the user. Furthermore, in the mode in which the fixed password is used, the fixed password itself is typically not stored in the storage 102 or the like, but rather a hash value is stored that is obtained by adding a salt to the fixed password and then inputting the result to a hash function.

In the mode in with the dynamic password is used, a method may be considered in which the dynamic password is displayed due to the user taking the smartphone by hand from the pocket and then operating the touchscreen.

At this time, the user can learn the dynamic password without the hand of the user touching anything, if a mode is used in which a beacon transmitter is installed in the vicinity of the speaker and the microphone used by the authentication system 101, a wearable device such as a smartwatch or a smartphone or the like then in cooperation with the transmitter detects the beacon so that the smartwatch or the like is given notification of the dynamic password, and information pertaining to the notification is displayed as a popup in a standby screen.

Furthermore, the authentication key can be communicated to the user by installing the display in the vicinity of the speaker and the microphone used by the authentication system 101 and providing information to the user via the display. Most simply, a method may be adopted by which a string of characters displayed on the display screen is used as the authentication key.

In the method using the fixed authentication key, the determiner 107, by voice recognition, recognizes the word expression read by the user from the second sound.

Then the necessary condition for determining that the user has the authority pertaining to the specified user ID is taken to be that the recognized word expression is valid as the authentication key for the specified user ID. In the mode using the fixed password, the necessary condition is taken to be success in verification that the result of adding the salt to the recognized word expression and then inputting to the hash function matches the value stored in the storage 102 or the like.

Moreover, the dynamic password technology disclosed in U.S. Pat. No. 6,141,751 may be used.

That is to say, each of multiple user IDs is associated beforehand with a selection rule indicating order of position of selection of elements included in a table. The selection rule is stored in the storage 102 in association with the user ID.

Then the outputter 104, while providing to the user via the display a random table in which a random value is imbedded in each element, also outputs the masking sound.

Upon acquiring from the user the second sound including the key-reading speech, the determiner 107 extracts, from the provided random table, a value string that arranges the values embedded in the elements selected in accordance with the selection rule associated with the specified user ID.

Then if the word expression recognized by voice recognition from the second sound and the extracted value string match each other, the recognized word expression is regarded as valid as the authentication key for the specified user ID.

Moreover, in the method using the voiceprint, the second sound matching the voiceprint associated with the specified user ID is taken to be the necessary condition for determination that the user has the authority pertaining to the specified user ID.

The two conditions that are the matching of the authentication key with the recognized word expression and the matching of the voiceprints can both be adopted as necessary conditions for success in the authentication, although a single one of these conditions may be used according to usage.

Furthermore, upon the updater 108 determining that the user has the authority pertaining to the specified user ID, the authentication system appends or saves by overwriting to the storage, in association with the specified user ID, the second sound, or a result obtained by dividing the second sound in accordance with units constituting the second sound, as recorded sound.

For example, in the case in which the authentication key is formed from multiple characters, the waveform of the second sound is divided into a part for each spoken character, and each part is appended or saved by overwriting as the recorded sound for the user ID.

In the case in which the environment of registration in the authentication system 101 is different from the environment in which authentication is actually performed, the environment of recording the voice of the user is different, for example, as in the mode by which room access management for the cleanroom or operating room is performed by authentication by the authentication system 101 by the user who uses a microphone of a computer or server computer used in a daily workplace of the user.

In this mode, the effect of masking can be increased by using speech having previously been successful as the recorded sound for authentication, that is to say, by using speech suitable for the environment.

Example of Use for Room Access Management

Figure 2:
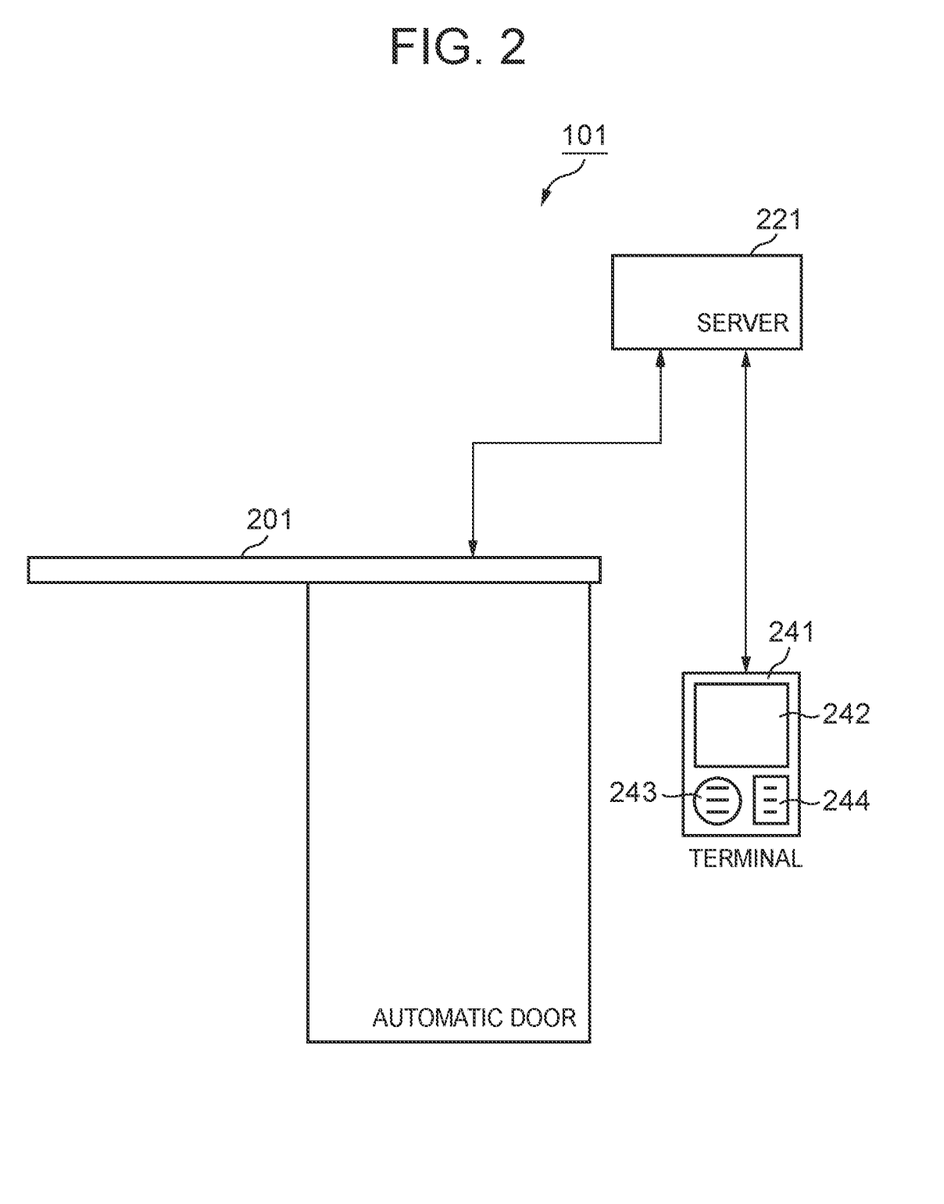
FIG. 2 is a descriptive drawing illustrating an example of use of the authentication system according to the embodiment of the present disclosure for room access management.

FIG. 2 is a descriptive drawing illustrating an example of use of the authentication system according to the embodiment of the present disclosure for room access management. The present usage example is described below with reference to the present drawing.

In the authentication system 101 according to the present usage example, a server 221 for controlling opening and closing of an automatic door 201 for performing room access management and a terminal 241 installed in the vicinity of the automatic door 201 are communicatively connected to each other.

The terminal 241 is shaped similarly to a home interphone indoor device and has a display 242, a speaker 243, and a microphone 244. Furthermore, in order to enable input as a substitute for voice input, the display 242 may be a touch screen, or various types of switches, keys, buttons, or the like may be further provided.

The server 221 controls the terminal 241 to output a message or speech to the display 242 or the speaker 243. Moreover, speech is detected by the microphone 244, and voice recognition processing, voiceprint processing, or the like of the detected speech is performed. The server 221 stores a selection rule or a recorded sound associated with the user ID, and by using such stored information, performs authentication of the user and suppresses information leakage.

Figure 3:
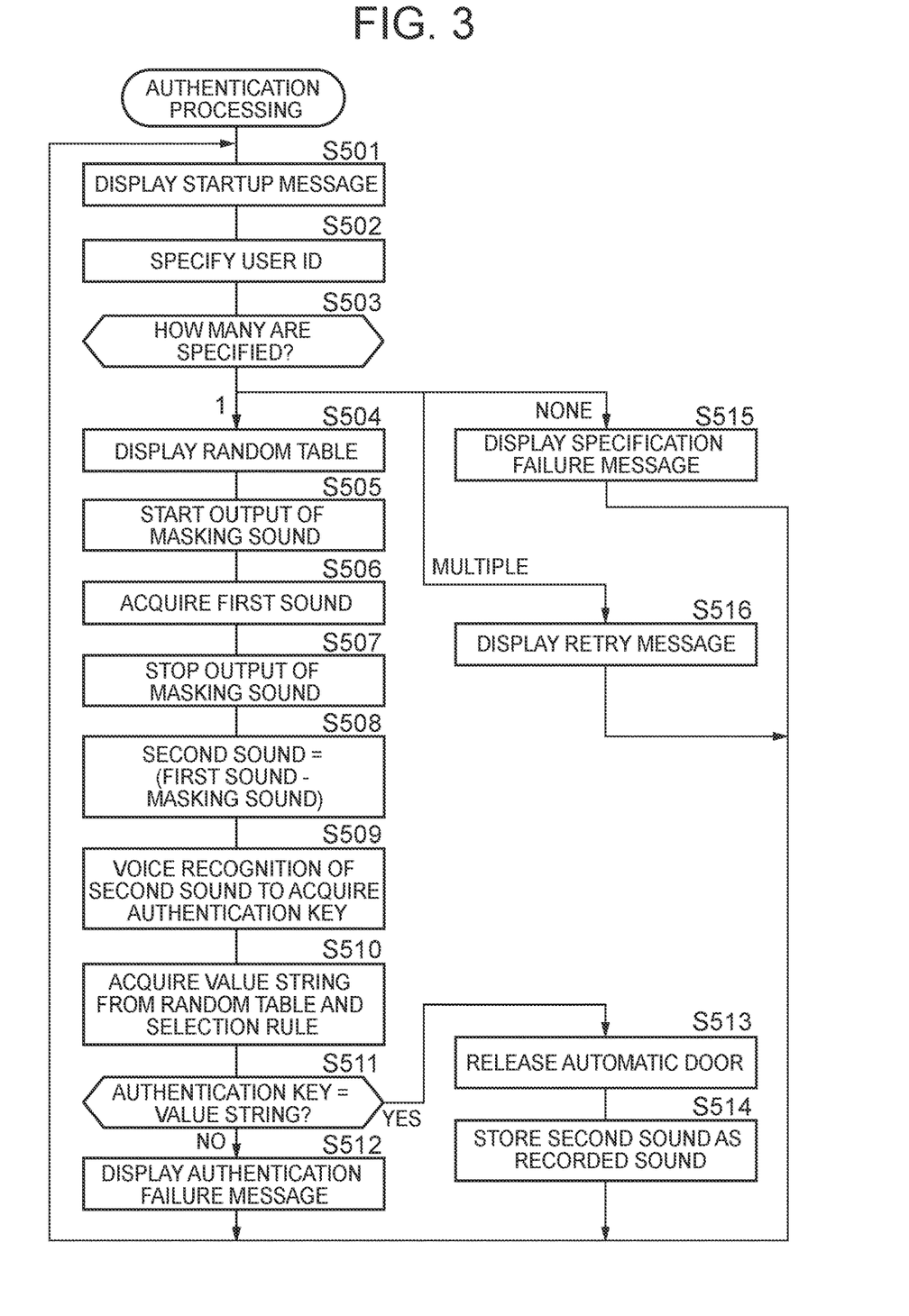
FIG. 3 is a descriptive drawing illustrating control of authentication processing according to the embodiment of the present disclosure.

Together with display screen examples of the display 242 of the terminal 241, processing by the authentication system 101 is described below. FIG. 3 is a descriptive drawing illustrating control of authentication processing according to the embodiment of the present disclosure. FIGS. 4A to 4E are display screen examples occurring on the display 242 of the terminal 241.

Figure 4A:
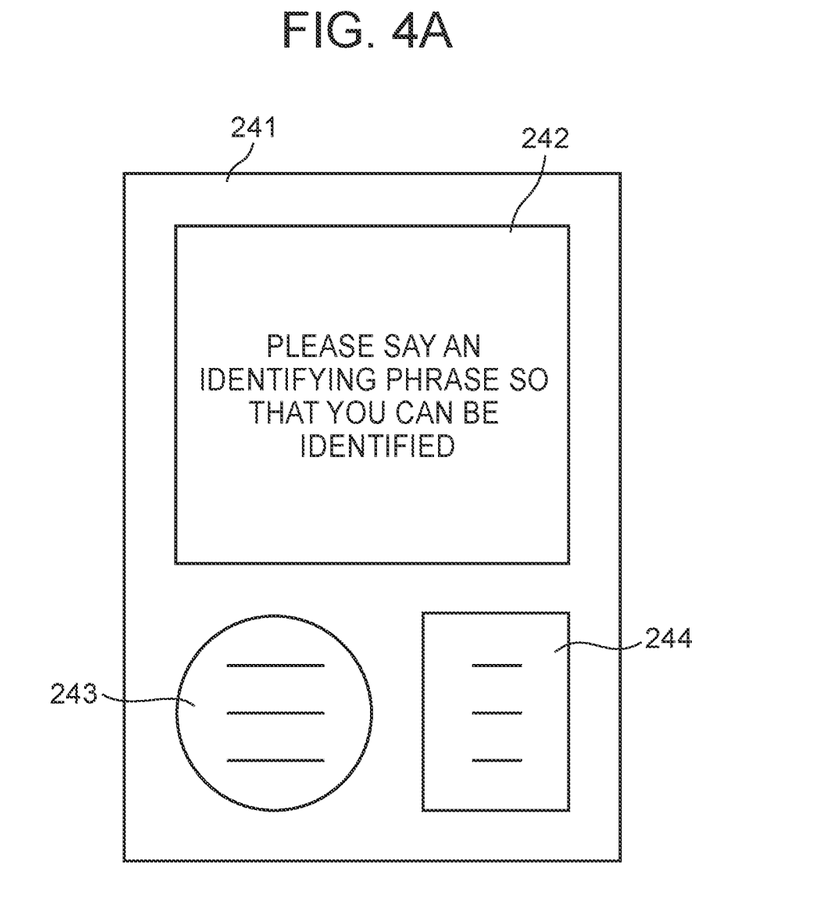
FIG. 4A is a descriptive drawing illustrating a display screen example of the authentication system according to the embodiment of the present disclosure.

Upon the start of the present processing, the authentication system 101 displays on the display 242 illustrated in FIG. 4A a startup message such as "please say an identifying phrase so that you can be identified" (step S501).

Then the authentication system 101 identifies the user ID on the basis of the identifying speech detected by the microphone 244 (step S502).

In the case in which the identifying phrase to be spoken by the user identifies the user, and classification by voiceprint is possible, a wake-up word may be used in common by all the users. Moreover, in the mode in which the speech of the user is converted to text by voice recognition, the last name, first name, nickname, identification number, or the like of each user may be used as a substitute for the voiceprint or in addition to the voiceprint.

Figure 4B:
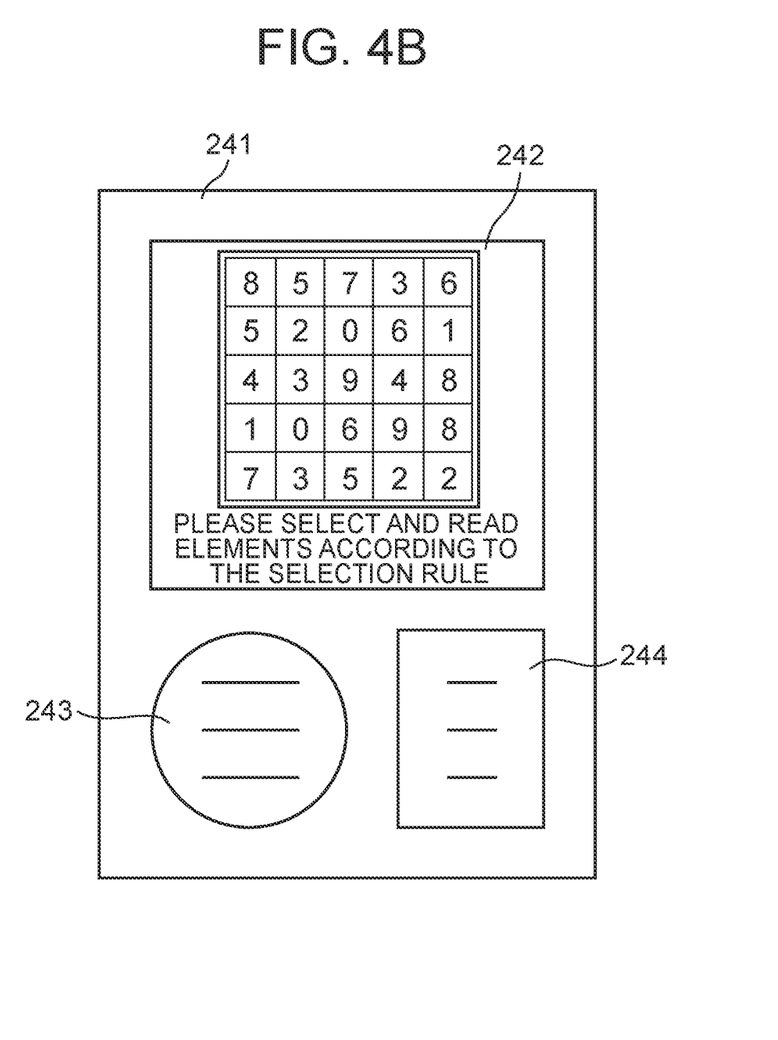
FIG. 4B is a descriptive drawing illustrating another display screen example of the authentication system according to the embodiment of the present disclosure.

If only a single user ID is specified ("1" in step S503), the authentication system 101 as illustrated in FIG. 4B displays a random table on the display 242 (step S504).

In the display screen example illustrated in the present drawing, the random table is an array of 5 rows and 5 columns, and a single digit number is included in each square. Moreover, a key message is displayed that says "please select and read elements according to the selection rule". Moreover, although not illustrated in the present display screen example, the specified user ID may also be displayed on the display 242.

For example, in the case in which the selection rule corresponding to the user ID is "row 1 column 1, row 2 column 5, row 3 column 3, and row 5 column 5", from the displayed random table, the value string arranging the values embedded in these elements is the user authentication key "8192". Thus the user is to say, as the key-reading speech, in Japanese "Hachi Ichi Kyū Ni" or in English "eight one nine two".

Furthermore, the authentication system 101, via the speaker 243, starts output of the masking sound in accordance with the specified user ID (step S505).

Next, the authentication system 101 acquires the first sound detected by the microphone 244 (step S506), and stops the output of the masking sound (step S507). In the aforementioned manner, the first sound includes each component of the masking sound, the environmental sounds, and the key-reading speech spoken by the user.

Furthermore, the authentication system 101 acquires the second sound by removing the masking sound component from the first sound (step S508).

Then by using voice recognition to convert the second sound into text, the authentication system 101 obtains the authentication key read by the user (step S509). In the present embodiment, the authentication key is a numeric string due to use of the authentication key that, in accordance with the selection rule, arranges the single digit numerals disposed in the random table.

Thereafter, the authentication system 101 acquires the value string that arranges the elements selected from the random table displayed on the display 242 in accordance with the selection rule associated with a specified single user ID (step S510). Thereafter, determination is made as to whether the obtained value string and the obtained authentication key match each other (step S511).

Figure 4C:
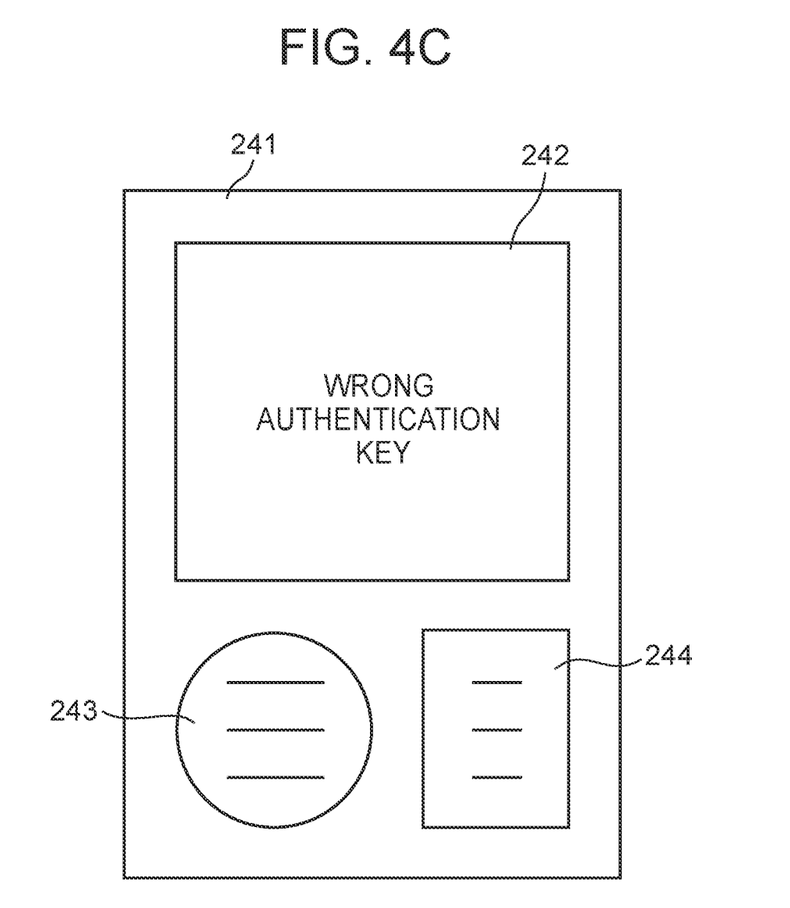
FIG. 4C is a descriptive drawing illustrating yet another display screen example of the authentication system according to the embodiment of the present disclosure.

If the obtained value string and the obtained authentication key do not match (NO in step S511), authentication is taken to have failed, and as illustrated in FIG. 4C for example, the authentication system 101 displays on the display 242 for a fixed period an authentication failure message such as "wrong authentication key" (step S512), and then control returns to step S501. Furthermore, control may return to step S502 until the count of consecutive failures reaches a prescribed count (not illustrated).

If the obtained value string and the obtained authentication key match each other (YES in step S511), authentication is taken to be successful, and the authentication system 101 sends to the automatic door 201 a control signal for opening of the door (step S513).

Upon receiving the control signal, the automatic door 201 opens for a fixed period of several seconds. Moreover, the automatic door 201 may be equipped with a human-detection sensor, and after opening of the door, the opening of the door may continue until a human is no longer detected, and the door is then closed.

Furthermore, in addition to matching of the value string and the authentication key, matching of the voiceprint of the specified user ID with the second sound may be used as a condition for the success of authentication.

Furthermore, the authentication system 101 records as the recorded sound the second sound in association with the user ID (step S514), and control returns to step S501. In the present example, the recorded sound can be made by dividing the second sound into single digit numerical units in order that the value string and the authentication key are numeric strings. Furthermore, in the present mode, the key-reading speech inputted each time is randomized, and thus the obtained second sound may be used as is as the recorded sound.

Figure 4D:
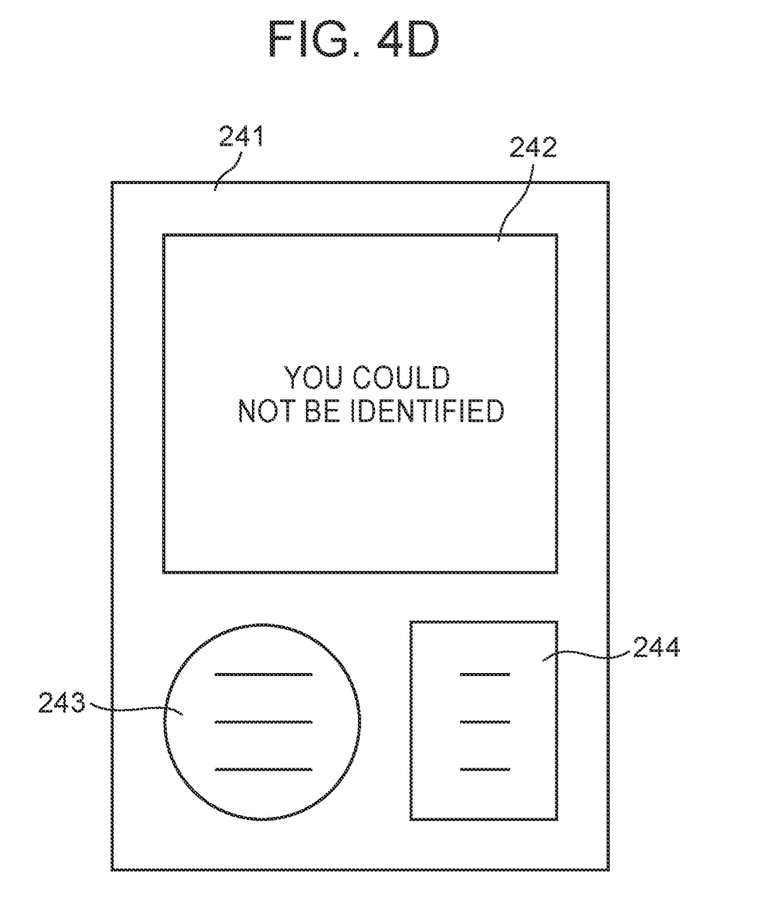
FIG. 4D is a descriptive drawing illustrating yet another display screen example of the authentication system according to the embodiment of the present disclosure.

Furthermore, when there is no specified user ID (NONE in step S503), for example as illustrated in FIG. 4D, the authentication system displays on the display 242 for a fixed period a specification failure message such as "you could not be identified" (step S515), and then control returns to step S501.

Figure 4E:
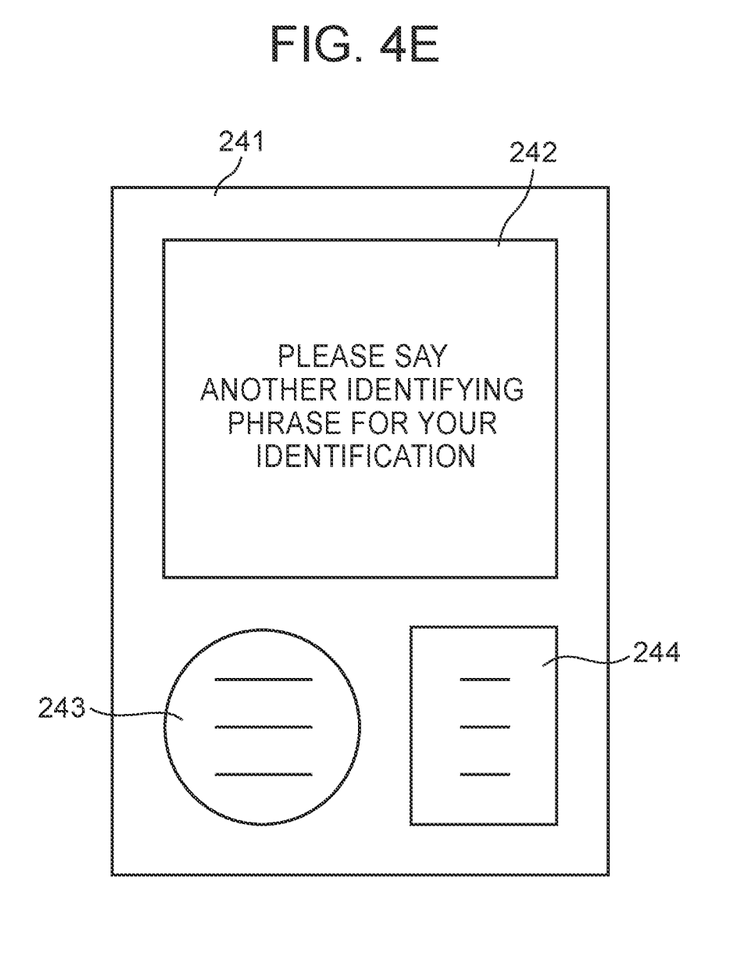
FIG. 4E is a descriptive drawing illustrating yet another display screen example of the authentication system according to the embodiment of the present disclosure.

Moreover, in the case of multiple specified user IDs ("MULTIPLE" in step S503), the authentication system 101 as illustrated in FIG. 4E, displays on the display 242 for a fixed period a retry message such as "please say another identifying phrase for your identification" (step S516), and then control returns to step S501.

In the aforementioned manner in the present embodiment, due to use in the masking sound of the recorded sound including the speech previously spoken by the user seeking to receive authentication, a third party hearing the authentication key read by the user is made difficult, and leakage can be prevented.

Overview

In the aforementioned manner, an authentication system according to the present embodiment includes:

a storage configured to store, for each of a plurality of user IDs, a voiceprint of a user having authority pertaining to the user ID in association with a recorded sound including speech spoken previously by the user having the authority pertaining to the user ID;

a specifier configured to specify a user ID of a user attempting to receive authorization;

an outputter configured to output a masking sound including a recording sound stored in association with the specified user ID;

an acquirer configured to acquire a first sound that includes (i) a key-reading speech of the user reading an authentication key and (ii) the outputted masking sound;

a remover configured to acquire a second sound by removing the masking sound from the acquired first sound; and a determiner configured to determine whether the user has the authority pertaining to the specified user ID based on the acquired second sound.

Moreover, the authentication system in accordance to the present embodiment may further include:

an updater configured to, upon determination that the user has the authority pertaining to the specified user ID, append or save by overwriting to the storage, as the recorded sound and in association with the specified user ID, (i) the second sound or (ii) a result of dividing the second sound in accordance with units constituting the authentication key.

The authentication system according to the present embodiment may be configured such that the outputter superimposes at least a part of the recorded sound stored in association and the specified user ID on each other, and outputs masking sound.

Moreover, the authentication system according to the present embodiment may be configured to:

use voice recognition to recognize from the second sound a word expression read by the user, and use, as a necessary condition for determination that the user has the authority pertaining to the specified user ID, validity of the recognized word expression as the authentication key pertaining to the specified user ID.

Moreover, the authentication system according to the present embodiment may be configured to:

for each of the user IDs, associate beforehand a selection rule indicating an order of positions of selection of elements included in a table;

together with the outputting of the masking sound, providing to the user a random table in which each embedded element is a random value;

extract a value string arranging the values embedded in the elements selected by the selection rule associated with the specified user ID; and take the recognized word expression to be valid as the authentication key pertaining to the specified user ID when the recognized word expression and the extracted value string match each other.

Moreover, the authentication system according to the present embodiment can be configured to use, as the necessary condition for determining that the user has the authority pertaining to the specified user ID, matching of the second sound with the voiceprint stored in association with the specified user ID.

Moreover, the authentication system according to the present embodiment may be configured to:

after identifying the user ID, acquire an identifying sound that includes an identifying speech spoken by the user attempting to receive authentication;

use voice recognition to recognize from the identifying sound a phrase read by the user; and specify a user ID (i) that is a user ID allocated the recognized phrase as the identifying phrase and (ii) for which the identifying sound matches the voiceprint stored in association with the user ID.

Moreover, the authentication system according to the present embodiment may be configured to, for each of the plurality of the user ID, allocate an identifying phrase that is different from the identifying phrase of the other user IDs of the plurality of user IDs.

Moreover, the authentication system according to the present embodiment may be configured to:

for each user having the authority pertaining to the user ID of the plurality of user IDs, allocate a respective identifying phrase of a plurality of identifying phrases; and when a plurality of the user IDs is specified, until just a single user ID is specified, repeatedly (i) prompt the user to read a new identifying phrase, (ii) acquire and thereafter a new identifying sound that includes a new identifying speech spoken by the user, and (iii) identify the user ID based on the new identifying sound.

Moreover, an authentication method according to the present embodiment, by an authentication system, for each of a plurality of user IDs, storing a voiceprint of a user having authority pertaining to the user ID in association with a recorded sound including speech previously by the user having the authority pertaining to the user ID, the method including:

specifying the user ID of the user trying to receive authentication;

outputting a masking sound including a recorded sound stored in association with the specified user ID;

acquiring a first sound including (i) a key-reading speech of the user reading an authentication key and (ii) the outputted masking sound;

acquiring a second sound by removing the masking sound from the acquired first sound; and determining whether the user has the authority pertaining to the specified user ID based on the acquired second sound.

Moreover, a program according to the present embodiment causes a computer or a computer group storing, for each user ID, a voiceprint of a user having authority pertaining to the user ID in association with a recorded sound including speech spoken previously by the user having authority pertaining to the user ID, to perform the following processing:

specifying the user ID of the user to receive authentication;

outputting a masking sound including a recorded sound stored in association with the specified user ID;

acquiring a first sound including (i) a key-reading speech of the user reading the authentication key and (ii) the outputted masking sound; acquiring a second sound by removing the masking sound from the acquired first sound; and determining whether the user has the authority pertaining to the specified user ID based on the acquired second sound.

Moreover, a non-transitory computer-readable information recording medium may be configured to record the aforementioned program.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure enables providing of an authentication system and an authentication method suitable for prevention of leakage of a key-reading speech during user authentication based on the key-reading speech that is read by a user reading an authentication key, and a non-transitory computer-readable information recording medium for recording a program for causing a computer or a computer group to function as the authentication system.

What is claimed is:

1. An authentication system comprising:
a storage configured to store, for each of a plurality of user IDs, a voiceprint of a user having authority pertaining to the user ID in association with a recorded sound including speech spoken previously by the user having the authority pertaining to the user ID;
a specifier configured to (i) acquire an identifying sound including identifying speech spoken by a user attempting to receive authentication, (ii) recognize from the identifying sound by voice recognition a phrase read by the user, and (iii) specify a user ID allocated the recognized phrase as an identifying phrase and for which the identifying sound matches the voiceprint stored in association with the user ID;
an outputter configured to output a masking sound by superimposing and outputting a part of all of the plurality of recorded sounds stored in association with the specified user ID;
an acquirer configured to acquire a first sound that includes (i) a key-reading speech of the user reading an authentication key and (ii) the outputted masking sound;
a remover configured to acquire a second sound by removing the masking sound from the acquired first sound; and
a determiner configured to determine whether the user has the authority pertaining to the specified user ID based on the acquired second sound, wherein
the determiner uses, as necessary conditions for determining that the user has the authority pertaining to the specified user ID, (i) recognizing from the second sound a word expression read by the user, and the recognized word expression being valid as the authentication key for the specified user ID, and (ii) the second sound matching the voiceprint stored in association with the specified user ID.

2. The authentication system according to claim 1, further comprising:
an updater configured to, upon determination that the user has the authority pertaining to the specified user ID, append or save by overwriting to the storage, as the recorded sound and in association with the specified user ID, (i) the second sound or (ii) a result of dividing the second sound in accordance with units constituting the authentication key.

3. The authentication system according to claim 1, wherein
the authentication system:
provides to the user, together with the outputting of the masking sound, a random table in which one of a plurality of random values is embedded in each element of elements of the random table, a selection rule indicating an order of selection of positions of the elements included in the table being associated beforehand with the user ID for each of the user IDs;
extracts, from the provided random table, a value string arranging the values embedded in the elements selected by the selection rule associated with the specified user ID; and
takes the recognized word expression to be valid as the authentication key pertaining to the specified user ID when the recognized word expression and the extracted value string match each other.

4. The authentication system according to claim 1, wherein
prior to specifying the user ID, the authentication system:
acquires an identifying sound that includes an identifying speech spoken by the user attempting to receive authentication;
uses voice recognition to recognize from the identifying sound a phrase read by the user; and
specifies a user ID that is a user ID allocated the recognized phrase as the identifying phrase and for which the identifying sound matches the voiceprint stored in association with the user ID.

5. The authentication system according to claim 1, wherein
for each of the user IDs, the authentication system allocates an identifying phrase that is different from the identifying phrase of the other user IDs.

6. The authentication system according to claim 1, wherein the authentication system:
for each user having the authority pertaining to the user ID of the plurality of user IDs, allocates a plurality of identifying phrases; and
when a plurality of the user IDs is specified, until just a single user ID is specified, repeatedly (i) prompts the user to read a new identifying phrase, (ii) acquires a new identifying sound that includes a new identifying speech spoken by the user, and (iii) specifies the user ID based on the new identifying sound.

7. An authentication method, by an authentication system that, for each of a plurality of user IDs, stores a voiceprint of a user having authority pertaining to the user ID in association with a plurality of recorded sounds including a plurality of speeches previously spoken by the user having the authority pertaining to the user ID, the method comprising:

acquiring an identifying sound including an identifying speech spoken by a user attempting to receive authentication, recognizing from the identifying sound by voice recognition a phrase read by the user, and specifying a user ID for which the recognized phrase is allocated as an identifying phrase and for which the identifying sound matches the voiceprint stored in association with the user ID;

outputting a masking sound by superimposing and outputting a part of all of the plurality of recorded sounds stored in association with the specified user ID;

acquiring a first sound including (i) a key-reading speech of the user reading the authentication key and (ii) the outputted masking sound;

acquiring a second sound by removing the masking sound from the acquired first sound; and determining whether the user has the authority pertaining to the specified user ID based on the acquired second sound, wherein necessary conditions for determining that the user has authority pertaining to the specified user ID are: (i) a word expression read by the user is recognized from the second sound, and the recognized word expression is valid as the authentication key for the specified user ID, and (ii) the second sound matches the voiceprint stored in association with the specified user ID.

8. A non-transitory computer-readable information recording medium for recording a program for causing a computer or a computer group, for each of a plurality of user IDs, storing a voiceprint of a user having authority pertaining to the user ID in association with a plurality of recorded sounds including a plurality of speeches previously spoken by the user having the authority pertaining to the user ID, to execute processing comprising:

acquiring an identifying sound including an identifying speech spoken by a user attempting to receive authentication, recognizing from the identifying sound by voice recognition a phrase read by the user, and specifying a user ID for which the recognized phrase is allocated as an identifying phrase and for which the identifying sound matches the voiceprint stored in association with the user ID;

outputting a masking sound by superimposing and outputting a part of all of the recorded sounds stored in association with the specified user ID;

acquiring a first sound including (i) a key-reading speech of the user reading the authentication key and (ii) the outputted masking sound;

acquiring a second sound by removing the masking sound from the acquired first sound; and determining whether the user has the authority pertaining to the specified user ID based on the acquired second sound, wherein necessary conditions for determining that the user has authority pertaining to the specified user ID are: (i) a word expression read by the user is recognized from the second sound, and the recognized word expression is valid as the authentication key for the specified user ID, and (ii) the second sound matches the voiceprint stored in association with the specified user ID.

\* \* \* \* \*